United States Patent [19]

Luhleich et al.

[11] Patent Number: 4,722,762
[45] Date of Patent: Feb. 2, 1988

[54] METHOD OF MAKING SHAPED BODIES OF SILICON CARBIDE OR OF GRAPHITE OR GRAPHITE-LIKE MATERIAL WITH A SILICON CARBIDE SURFACE

[75] Inventors: Hartmut Luhleich, Duren; Francisco Dias, Jülich; Ashok K. Gupta, Jülich; Ernö Gyarmati, Jülich; Marian Kampel, Heinsberg-Oberbruch; Rudolf Münzer, Alsdorf; Aristides Naoumidis, Jülich, all of Fed. Rep. of Germany

[73] Assignee: Kernforschungsanlage Julich GmbH, Jülich, Fed. Rep. of Germany

[21] Appl. No.: 552,846

[22] Filed: Nov. 16, 1983

Related U.S. Application Data

[63] Continuation of Ser. No. 307,593, Oct. 1, 1981, abandoned.

[30] Foreign Application Priority Data

Oct. 2, 1980 [DE] Fed. Rep. of Germany ....... 3037199

[51] Int. Cl.⁴ ................................................. C09J 5/00
[52] U.S. Cl. .................................... 156/305; 156/155; 156/278; 156/285; 156/293; 156/325; 264/261; 427/399; 428/408; 428/420

[58] Field of Search ............... 156/305, 278, 325, 285, 156/155, 293; 427/399; 264/261; 428/408, 420

[56] References Cited

U.S. PATENT DOCUMENTS

| 2,979,814 | 4/1961 | Steinberg | 156/325 |
| 3,019,128 | 1/1962 | Smiley | 428/420 |
| 3,367,812 | 2/1968 | Watts | 156/155 |
| 3,874,958 | 4/1975 | Scholtis et al. | 156/155 |

FOREIGN PATENT DOCUMENTS 841716 7/1960 United Kingdom ................ 156/325

*Primary Examiner*—John J. Gallagher
*Attorney, Agent, or Firm*—Karl F. Ross; Herbert Dubno

[57] ABSTRACT

A method of making shaped bodies of silicon carbide, of graphite coated with silicon carbide or of a graphite-like material with a silicon carbide surface wherein a graphitic body is assembled from preformed parts in the desired shape and is immersed, under a chemically inert atmosphere, in a silicon melt and after penetration of the melt into gaps between abutting surfaces of the body and after reaction of the silicon with the graphite or the graphite-like material to form silicon carbide at the junctions, the body is removed from the melt and is cooled in a chemically inert atmosphere.

5 Claims, 2 Drawing Figures

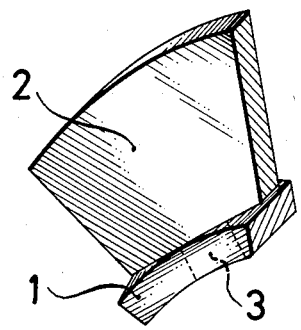
FIG. 1
FIG. 2
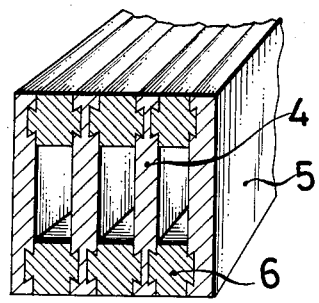

METHOD OF MAKING SHAPED BODIES OF SILICON CARBIDE OR OF GRAPHITE OR GRAPHITE-LIKE MATERIAL WITH A SILICON CARBIDE SURFACE

This application is a continuation of application Ser. No. 307,593 filed Oct. 1, 1981 now abandoned.

FIELD OF THE INVENTION

Our present invention relates to a method of making silicon carbide bodies or bodies of graphite or graphite-like (carbonceous) material which are to have silicon carbide coatings or silicon carbide surface regions and especially portions bonded together by silicon carbide junctions.

BACKGROUND OF THE INVENTION

The advantages of silicon carbide as a refractory corrosion-resistant material, both as a component of devices which are to be exposed to corrosive atmospheres or high temperatures and as a coating or surface layer for bodies which are to be subjected to thermal and chemical stress have long been recognized.

For example, in machines and apparatus which must be subjected to extremely high temperatures for which refractory metals are not suitable, silicon carbide elements may be employed or metal bodies may be coated with silicon carbide.

Silicon carbide has also been found to be applicable in many locations where its resistance to attack by chlorine, sulfur, oxygen and strong acids is important. Thus it is not uncommon to find silicon carbide bodies serving as chemical process apparatus or in chemical reactors and in machines such as turbines subjected to extremely high temperatures and attacked by corrosive gases at such elevated temperatures.

It has already been proposed to fabricate such bodies from silicon carbide by a hot-pressing method which utilizes the sinterability of silicon carbide powders under pressure.

For bodies of more complex shape, for example, the silicon carbide powder is placed in a die of appropriate shape and subjected to elevated pressures at a temperature between 1800° C. and 2000° C. to sinter the particles together and form a coherent article.

British Pat. No. 866,813 and U.S. Pat. No. 3,275,722, moreover, teach the admixture of binders to powders containing silicon carbide, the drying of the mixture, the pulverization of the resulting agglomerate, and the pressing of the powder thereby obtained to so-called green preforms. The latter can be thermally treated to eliminate the binder and the thermally treated bodies sintered at a temperature of about 2000° C. in vacuum or the temperatures between 1500° C. and 1700° C. in a silicon vapor atmosphere which increases the silicon content of the fused body.

Experience with these methods has shown that they can be used only for articles of relatively simple shape if time-consuming machining and finishing steps are not desired. For more complex shapes, however, such machining steps are essential. Because of the high hardness of the silicon carbide bodies, the machining thereof is time-consuming and expensive requiring special tools and handling procedures.

Complex bodies, for example ceramic heat exchangers, parts of gas turbines, metal-smelting crucibles, generally must be assembled from a number of parts. When these bodies are composed of ceramics, the parts are bonded together by a ceramic-like composition, e.g. a slip which is applied between the prefabricated parts and after a firing of the assembled body, fuses with ceramic bond the parts together at their abutting surfaces. Such a process has been described in German Pat. No. 1,796,279.

Generally the parts which are joined by this method have previously been fired in accordance with ceramic handling technique so that the firing which joins the parts utilizing the ceramic slip is an after-firing.

This process has several drawbacks. For example, the quality of the slip generally differs from the quality of the parts which are to be joined thereby and frequently the resulting bond or Junction is not as strong as the parts which have been thus bonded. Furthermore, the difference in qualities between the slip and the ceramic of the parts Joined thereby may introduce stress differentials when the finished body is subjected to high temperatures or pressures.

It has also been proposed to join parts composed of graphite or graphite-like materials, hereinafter referred to collectively as carbonaceous materials, by the use of metal foils which are disposed at the junction. In this process, a foil is inserted between the abutting surfaces of the bodies to be Joined and the assembly is heated under pressure to bring about a reaction between the foil and the carbon of the graphite or graphite-like bodies. As a result, a film is formed at the junction which consis of a metal carbide of a high strength (see D. H. Sandstrom, *Joining Graphite to Graphite with Transition Metal Foils*, Los Alamos Scientific laboratory of the University of California LA—3960, Los Alamos, 1968.

However, when attempts are made to utilize the same approach with a thin layer of silicon, correspondingly effective results are not obtained. Furthermore, the fabrication of silicon in such foil thicknesses is extremely expensive and impractical.

British Pat. No. 713,710 describes a process for producing silicon carbide bodies or for coating graphite or graphite-like bodies with silicon carbide in which carbide layers are produced by vapor-depositing silicon in an inert atmosphere on the substrate or by immersing the graphite substrate in a silicon melt.

The immersion of bodies of graphite in metal melts to ultimately form protective layers of metal carbide on such bodies is also described in U.S. Pat. No. 2,929,714.

In both cases, however, complex structures in one piece can only be formed with machining, a disadvantage which has been illustrated with respect to the sintered bodies. Of course, the bodies can be assembled and joined by the use of ceramic slip into more complex structures, thereby avoiding the machining, but imbuin the process with the disadvantages which were discussed above in connection with the bonding of ceramic bodies with such slips.

From the foregoing, therefore, it will be apparent that prior to the present invention, there has been no fully successful method of fabricating silicon carbide bodies or body composed of graphite or graphite-like materials with silicon carbide coatings, of high complexity without the need for machining and in an economical manner such that the bodies are capable of withstanding thermal and mechanical stress and corrosive substances in an effective manner.

OBJECTS OF THE INVENTION

It is, therefore, the principal object of the present invention to provide an improved method of making complex structures of this latter type without the disadvantages or prior art methods.

A more specific object of the invention is to provide shaped bodies of silicon carbide or graphite or a graphite-like material (graphitic materials) having silicon carbide surfaces whereby machining is not required and highly effective junctions between parts of the body are obtained.

SUMMARY OF THE INVENTION

These objects and others which will become apparent hereinafter are attained, in accordance with the present invention in a method wherein prefabricated shaped parts of graphitic material are assembled with contacting surfaces in mutually abuttin relationship and the assembly is immersed in a silicon melt for a period and at a temperature, under a chemically inert atmosphere, sufficient to allow the molten silicon to penetrate to the interface formed by these surfaces and to react at this interface to form silicon carbide, whereupon the assembly is removed from the melt and cooled in a chemically inert atmosphere.

The parts can be composed of graphite or graphite-like materials which can be shaped with ease and the parts Joined by complementary or interfitting formations. For example, the graphite or graphite-like bodies can be provided with dovetail mortise-and-tenon, dado, lapped, tongue-and-groove, pin-and-hole or like Joints utilizing simple machining techniques and tools since graphite and graphite-like materials are comparatively soft and easily shaped. Other Joints include key-and-slot, wedge and even screw or taper joints.

The shaped bodies interconnecting in the manner described, thus form an assembly which is immersed, according to the invention in a silicon melt.

The liquid silicon penetrates into the interface between the assembled bodies and into the open pores of the graphitic material and, where the bodies have not been formed from silicon carbide previously, into the pores of the surface to react in situ with the graphitic material to form silicon carbide.

The melt and the assembly are than separated, either by withdrawing the assembly from the melt or by discharging the melt from the assembly and the latter is cooled in an inert atmosphere.

A seamless silicon carbide structure is found to form homogeneously between the bodies and has extremely high strength.

Depending upon the depth of penetration of the silicon into the bodies, the latter can be composed completely of silicon carbide or can have a core structure of the graphitic material, the silicon content progressively increasing from this core structure to the surface.

According to a feature of the invention, the assembly, upon removal from the silicon melt, is heated in vacuum or in a chemically inert atmosphere to a temperature which, after the reaction of the silicon with carbon of the bodies, vaporizes any excess elemental silicon from the free surfaces and open pores.

Thus adherent excess silicon is vaporized and removed. The temperature for this heat treatment is up to maximum boiling point of silicon at the pressure utilized.

It is also possible to remove excess elemental silicon by immersing the assembly in an etching solution in which silicon is solvable but which does not affect the silicon carbide further. The etching solution can be hydrofluoric acid or sodium hydroxide. Of course excess silicon can also be removed by mechanical action, e.g. machining in the form of grinding. It has been found that the penetration of the silicon melt into which the graphitic body depends in large measure upon the density and porosity thereof. We have found that best results are obtained with the bodies having a density or porosity sufficient to make them permeable to gases and we can measure the gas permeability by forming a cylinder of the graphitic material of a cross-sectional area of 1 cm$^2$ and a length of 1 cm and applying a pressure differential across the cylinder of 1 cm water column and determining the air throughput per minute. An air flow of 1 through 8 cm$^3$/min is preferred.

More generally, the graphitic material can have a density from 0.6 to 1.3 g/cm$^3$ and a pore volume of 30% to 70% of total volume (porosity=30% to 70%). Preferably the density is between 0.8 and 1.2 g/cm$^3$.

Such densities, porosities and gas permeabilities can be readily obtained by utilizing graphitic materials such as natural graphite, synthetic graphite, carbon black, powdered coke and like carbonaceous material mixed or sheathed in a cokable binder. Such bodies, after heating to cokefication temperatures, are ideal for the practice of the present invention.

We have noted that densities above 1.3 g/cm$^3$ make it difficult for the silicon to penetrate.

The graphitic bodies which can be used are preferably those manufactured by the process described in German Pat. Nos. 2,133,144 and 2,360,982.

In these processes, a slurry or powder of binder coated particles of the materials recited can be shaped and fired.

The preferred binders are synthetic resins such as phenol formaldehyde resins, pitch, tar and the like.

The slurry or powder can be made as described in German Pat. Nos. 2,040,252; 2,132,492; 2,712,628 and 2,746,020. In these methods the particles are mixed with a solution of the binder, preferably an alkali solution of the phenol formaldehyde resin, formed into a slurry and the latter is treated with acidic water serving as a precipitating liquid, e.g. in a mixing nozzle, to ensure uniform coating. The solids are settled from the liquid phase which can be decanted and a dry powder or moist powder is introduced into the molds without pressure or only slight pressure before the shaped bodies are heated to cokefication temperature.

BRIEF DESCRIPTION OF THE DRAWINGS

The above and other objects, features and advantages of the present invention will become more readily apparent from the following description, reference being made to the accompanying drawing in which:

FIG. 1 is a perspective view partly in section and partly in diagrammatic form of a turbine blade assembly adapted to be bonded by the process of the present invention.

FIG. 2 is a similar view of a heat exchanger formed from graphite bodies.

SPECIFIC DESCRIPTION

The turbine assembly of FIG. 1 comprises a blade 2 joined to the blade ring 1 by a pin 3. In the assembly of FIG. 2, the heat exchanger plates 4 and 5 are separated by bars 6 which are connected to the plates by dovetail formations. The parts of the assemblies of FIGS. 1 and 2 are composed of graphite and, after the assembly is formed, the surface regions of the bodies are transformed into silicon carbide surfaces and the bodies are bonded together at their junctions by silicon carbide utilizing the techniques described in one or more of the following examples.

EXAMPLE 1

The bodies are composed of electrographite particles coated with phenol formaldehyde resin and having a particle size range predominantly between 60 microns and 100 microns. A plate is formed from the particles by penetrating the particles cast in a suitable mold with methanol vapor at 70° C. in a vacuum drying vessel as described in German Pat. No. 2,360,982.

The resulting plate is heated 800° C. in an inert gas atmosphere to cokefy the resin binder and thereafter the plate is heated to 1500° C. and cooled in an inert atmosphere.

The resulting graphite plate had a density of 0.83 g/cm$^3$ and a total porosity of 63.4% with a ratio of open pores to total porosity of 0.9.

Measured in the manner described, the air permeability was 2.7 cm$^3$/min.

A turbine ring as shown in FIG. 1 with six blades was formed from the plate, the pin 3 being threaded into bores in the support 1.

Under a protective gas (argon) the assembly was immersed in molten silicon. The period of immersion lasted 12 minutes and was sufficient to transform the graphite bodies homogeneously into silicon carbide and to form a homogeneous silicon carbide Junction where the bodies contacted each other.

Excess silicon was evaporated in the protective gas atmosphere by heating the assembly, after removal from the bath, to 1800° C. for 30 minutes.

EXAMPLE 2

Calcined coke particles with a particle size of 60 to 100 microns predominantly were coated with phenol formaldehyde resin and cast into two molds one having the shape of the blade carrier 1 and the other the shape of the blades 2 with the feed 3 forming pins receivable in holes which were later drilled in the carrier.

The powder was lightly compressed in the molds and permeated with formaldehyde vapor (see German Pat. No. 2,360,980) at about 110° C. in a vacuum-drying vessel.

After cooling and removal from the molds, the bodies were coked at 800° C. under the protective gas atmosphere and then heated to about 1500° C.

After cooling under the protective gas atmosphere the material had a density of 0.96 g/cm$^2$, a porosity of 57.5%, a ratio of open to total porosity of 0.87 and a gas permeability as measured in the manner described of 2.5 cm$^3$/min Six bores were drilled in the holder and the feet of the graphitic blades were inserted in the holes. The assembly was immersed in a silicon bath for 10 min. under an argon atmosphere and the assembly then removed and excess silicon eliminated by boiling in 10% aqueous sodium hydroxide. The assembly was washed and homogeneous silicon carbide structures were found at the Junctions to bond the bodies together.

EXAMPLE 3

Electrographite particles coated with phenol formaldehyde resin were cast into molds to produce graphite plates having a thickness of 2 mm as described in the shape of the bodies in Example 1. The density of the plate was 1.0 g/cm$^3$ and the open porosity 56%. The air permeability was 3.0 cm$^3$/min. The plate was cut into the shapes of the members 4–6 described in connection with FIG. 2 and a compact heat exchanger assembled from these segments. The assembly was immersed in silicon as described in Example 1 and after removal from the molten silicon was heated for two hours in vacuum at about 1600° C. to remove excess silicon. The body was then cooled in an inert atmosphere and the junction were found to be seamless uniform structures of silicon carbide.

EXAMPLE 4

A powder mass of electrographite coated with phenol formaldehyde resin was introduced into a cylindrical mold having a central core and compressed with an annular ram to form two cylindrical graphite bodies in the manner described in Example 1. The two bodies were respectively internally and externally threaded and then screwed together. The assembly was immersed in the silicon bath as in Example 1 and adherent silicon was removed by grinding after cooling. Examination showed that the two bodies were joined by a homogeneous silicon carbide structure such that no interface was visible.

We claim:

1. A method of producing a silicon carbide body having homogeneously interconnected parts, comprising the steps of:
    (a) forming an assembly of shaped carbon parts such that junctions are formed between abutting surfaces of said parts, said parts having a density of 0.6 to 1.3 g/cm$^3$, a porosity of 30 to 70% and an air permeability of 1 to 8 cm$^3$/min.;
    (b) immersing said assembly in liquid silicon under a chemically inert atmosphere for a period sufficient at least to enable penetration of liquid silicon into each of said parts throughout the thickness thereof and into said junction and for a period sufficient at least to enable reaction between the penetrating silicon and the carbon of said carbon parts to form a homogeneous silicon carbide structure at each of said junctions and through said parts;
    (c) removing said assembly following step (b) from said liquid silicon; and
    (d) cooling the assembly removed from the liquid silicon under an inert atmosphere.

2. A method of producing a silicon carbide body having homogeneously interconnected parts, comprising the steps of:
    (a) forming an assembly of shaped carbon parts such that junctions are formed between abutting surfaces of said parts, and parts having a density of 0.6 to 1.3 g/cm$^3$, a porosity of 30 to 70% and an air permeability of 1 to 8 cm$^3$/min.;
    (b) immersing said assembly in liquid silicon under a chemically inert atmosphere for a period sufficient at least to enable penetration of liquid silicon into each of said parts throughout the thickness thereof and into said junction and for a period sufficient at least to enable reaction between the penetrating silicon and the carbon of said graphite parts to form a homogeneous silicon carbide structure at each of said junctions and through said parts;

(c) removing said assembly following step (b) from said liquid silicon;

(d) cooling the assembly removed from the liquid silicon under an inert atmosphere; and (e) removing excess silicon from said assembly prior to the cooling thereof by heating said assembly following step (c) to a temperature of at most 2000° C. and sufficient to vaporize adherent adherent elemental silicon in vacuum or in an inert atmosphere.

3. A method of producing a silicon carbide body having homogeneously interconnected parts, comprising the steps of:

(a) forming an assembly of shaped carbon parts such that junctions are formed between abutting surfaces of said parts, said parts having a density of 0.6 to 1.3 g/cm$^3$, a porosity of 30 to 70% and an air permeability of 1 to 8 cm$^3$/min.;

(b) immersing said assembly in liquid silicon under a chemically inert atmosphere for a period sufficient at least to enable pernetration of liquid silicon into each of said parts throughout the thickness thereof and into said junction and for a period sufficient at least to enable reaction between the penetrating silicon and the carbon of said carbon parts to form a homogeneous silicon carbide structure at each of said junctions and through said parts;

(c) removing said assembly following step (b) from said liquid silicon;

(d) cooling the assembly removed from the liquid silicon under an inert atmosphere; and (e) eliminating excess silicon adherent to said assembly by immersing said assembly following step (d) in a solution in which elemental silicon is soluble.

4. The method defined in claim 1, claim 2 or claim 3 wherein said parts have a density of 0.8 to 1.2 c/cm$^3$.

5. The method defined in claims 1, 2 or claim 3 wherein said parts are formed by the steps of:

($a_1$) coating carbonaceous particles with a binder;

($a_2$) shaping the binder-coated carbonaceous particles to the shape of one of said carbon parts; and ($a_3$) coking the shaped particles and binder.

* * * * *